United States Patent [19]

Sorensen et al.

[11] 4,007,060
[45] Feb. 8, 1977

[54] PLASTIC CASE FOR FLAT RECHARGEABLE CELL

[75] Inventors: Dennis Dean Sorensen, Bloomington, Minn.; Richard Allan Erickson, New Richmond, Wis.; Harry Ellwood Iepson, Lino Lakes, Minn.

[73] Assignee: Gould Inc., Rolling Meadows, Ill.

[22] Filed: May 30, 1975

[21] Appl. No.: 582,234

[52] U.S. Cl. .................................. 429/53; 429/82
[51] Int. Cl.² ................................... H01M 2/02
[58] Field of Search .......... 136/166, 111, 177, 178, 136/173; 220/22, 307, DIG. 14; 174/52 S

[56] References Cited
UNITED STATES PATENTS

| | | | |
|---|---|---|---|
| 2,654,794 | 10/1953 | Zaugg | 136/111 |
| 3,234,107 | 2/1966 | Kaufman et al. | 220/22 |
| 3,307,077 | 2/1967 | Bernstein | 174/52 S |
| 3,655,452 | 4/1972 | Cich | 136/173 |
| 3,801,373 | 4/1974 | Spellman | 136/173 |
| 3,887,394 | 6/1975 | Kaye | 136/166 |

*Primary Examiner*—Donald L. Walton
*Attorney, Agent, or Firm*—Leydig, Voit, Osann, Mayer & Holt, Ltd.

[57] ABSTRACT

A flat, sealed case for a secondary cell includes a flat shallow plastic base and a thin, flat plastic cover the periphery of which is sealed to the base and includes at least one internal restraint to prevent bulging of the flat cover and base upon a build-up of internal pressure within the cell case, for example during recharging.

9 Claims, 6 Drawing Figures

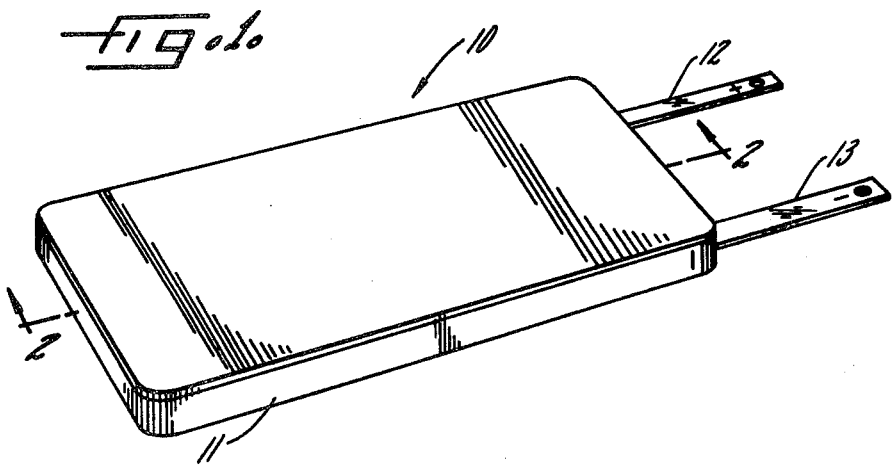
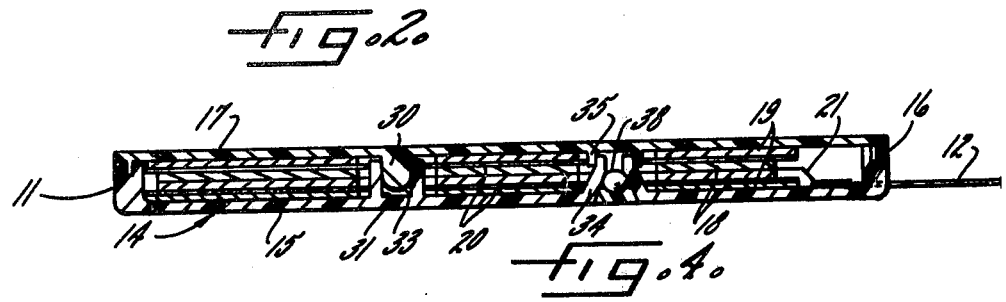
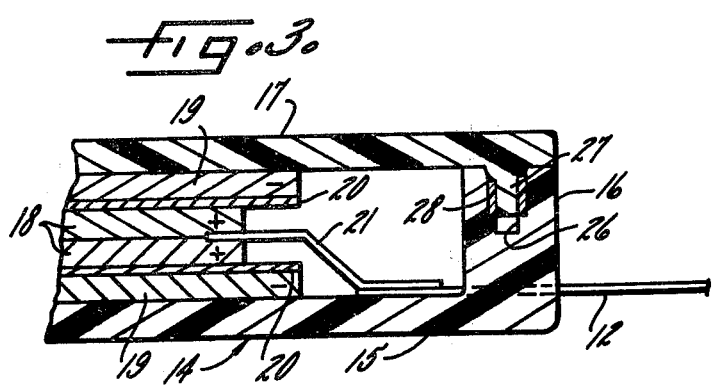
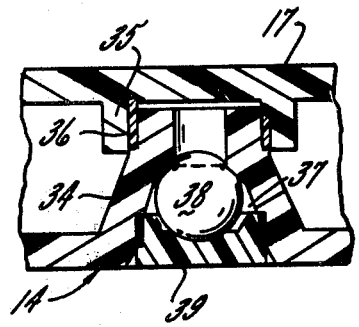
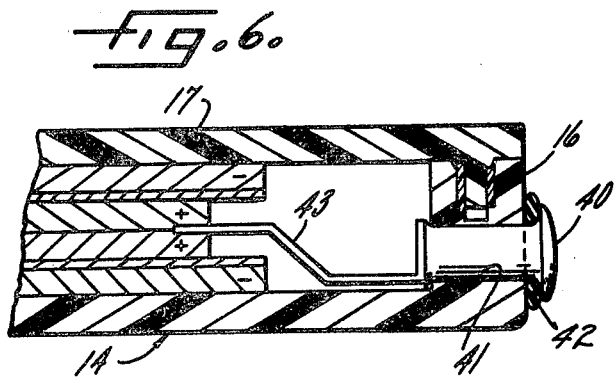
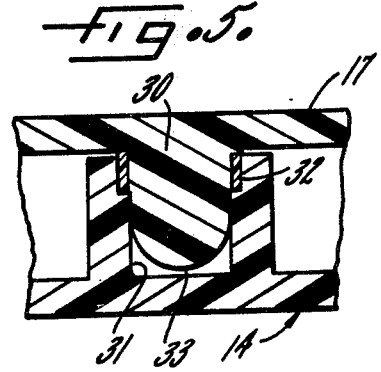

PLASTIC CASE FOR FLAT RECHARGEABLE CELL

BACKGROUND OF THE INVENTION

The present invention relates generally to rechargeable battery cells and more particularly concerns a flat plastic case for such cells.

During recent years there has been a tremendous growth in the manufacture and use of minature electronic devices such as hand-held calculators. Most of these devices are designed to operate on self-contained batteries in addition to being operable when plugged into a conventional electrical outlet, with or without an adapter. Many of the battery operated models utilize rechargeable batteries which, if properly and periodically recharged, last for long periods of time before replacement is required. However, one of the limitations on the physical design of hand-held calculators and the like which use rechargeable batteries has been the size and shape of conventional rechargeable batteries, most of which are cylindrical in shape and relatively space consuming.

Accordingly it is the primary aim of the present invention to provide a thin, flat case for a rechargeable battery cell.

A more specific object is to form such a cell case out of plastic material which can be inexpensively molded in two parts and then bonded together after insertion of the electrode and separator material.

It is a more detailed object to provide a thin, flat plastic battery cell case of the above type with internal restraints which prevent bulging or other deformation of the case upon a build-up of internal pressure within the case.

These and other objects and advantages of the invention will become apparent upon reading the following detailed description and upon reference to the drawings, in which:

BRIEF DESCRIPTION OF THE DRAWINGS

FIG. 1 is a perspective view of the flat battery cell case of the present invention;

FIG. 2 is a section taken along line 2—2 in FIG. 1;

FIGS. 3, 4 and 5 are enlarged fragmentary sections, respectively, of the right end, right center and left center portions see in FIG. 2; and, FIG. 6 is an enlarged fragmentary section, similar to FIG. 3, showing a modified terminal connector.

DETAILED DESCRIPTION OF THE INVENTION

While the invention will be described in connection with certain preferred embodiments and procedures, it will be understood that we do not intend to limit the invention to those specific embodiments and procedures. On the contrary, we intend to cover all alternatives, modifications and equivalents as may be included within the spirit and scope of the invention as defined by the appended claims.

Turning now to the drawings, there is shown in FIG. 1 a rechargeable battery cell 10 having a thin, flat case 11 embodying the present invention, and positive and negative terminals 12 and 13. As more clearly shown in FIG. 2, the cell case 11 includes a shallow, substantially flat base 14 having a bottom panel 15 with a low peripheral wall 16 at the sides and ends and a thin, flat cover 17 having a peripheral edge adapted to sealingly engage the peripheral wall 16. Within the case 11 are the positive and negative electrodes 18, 19 between which are separators 20. The positive electrodes 18 are connected to the positive terminal 12 by a connector 21 (see FIG. 5) and the negative electrodes 19 are similarly connected to the negative terminal 13 by a pair of connector elements (not shown).

Pursuant to the present invention, the flat base 14 and cover 17 are separately molded from plastic material and are subsequently bonded together to form the case 11 after the electrodes 18, 19 and separators 20 are in place. The plastic material used may be an ABS resin, a high impact polystyrene or a polysulfone material. It should be caustic resistant as well as being quickly and conveniently bonded such as by solvent, thermal or ultrasonic bonding techniques, the latter being preferred. In the embodiment shown in FIGS. 1, 2 and 3, the terminals 12, 13 are molded in the base 4 so as to lie on the bottom panel 15 and extend through the peripheral wall 16 at the end of the base. To insure a gas-tight seal between the terminals, which may be made of nickel, and the base 14, the terminals are preferably coated with a plastic and solvent mixture in the area where they extend through the wall 16 before the base 14 is molded.

In the preferred embodiment of the present invention, the peripheral wall 16 of the base 14 is formed with a groove 26 and the peripheral edge of the cover 17 is formed with a mating tongue 27. Preferably, the tongue 27 is slightly larger than the groove 26 permitting a force fit and, when ultrasonic energy is applied to the joint, molten plastic flows into any voids or irregularities between the tongue 27 and groove 26. When this molten plastic solidifies as indicated at 28, a gas-tight seal is formed. It will be understood, however, that other bonding techniques can also be employed.

In accordance with a further aspect of the present invention, opposing means are provided on the base 14 and cover 17 internally of the peripheral wall 16 and edge and are adapted to be secured to one another for restraining the flat cover 17 and bottom panel 15 of the base 14 from bulging upon a build-up of internal pressure within the sealed case 11. It will be appreciated that such internal pressure is generated within the case 11, particularly during recharging of the battery cell 10 and the pressure build-up increases as the rate of charging increases. Moreover, the force exerted on the cover, for example, is also dependent on its area and the deflection of the cover varies exponentially with distance between points of support.

Referring now to FIGS. 2, 3 and 4 two specific forms of internal restraints according to the present invention are illustrated. In FIG. 5 and the left center portion of FIG. 2, the internal restraint is in the form of a pin 30 extending downwardly from the cover 17 and received in and secured to a socket 31 formed in the base 14. Various forms of bonding may be employed to secure the pin 30 to the socket 31, but ultrasonic bonding is preferred with the subsequently solidified molten material indicated at 32. It should also be understood that the socket 31 and pin 30 may have various cross-sectional shapes such as circular, triangular, square, rectangular (in which case the terms mortise and tenon would aptly apply) or other geometric configurations. Preferably, however, the pin 30 is somewhat pointed or rounded at its tip 33 to provide for centering and ease of initial insertion in the socket 31.

As shown in FIG. 4 and the right center portion of FIG. 2, the internal restraint of this embodiment is in the form of a hollow pin 34 which extends up from the base 14 and is received in and secured to a socket 35 formed in the cover 17. Preferably the hollow pin 34 is ultrasonically bonded to the socket 35 with the subsequently solidified molten material indicated at 36. In this embodiment, the hollow pin 34 may also form the housing for a resealable vent 37 which includes a resilient ball 38 and an apertured cap 39. While the vent 37 per se is not part of the present invention, reference may be made to copending application Ser. No. 582,233 filed May 30, 1975, now U.S. Pat. No. 3,980,500 and entitled Resealable Vent for Plastic Battery Case for a further description of the structure and operation thereof. Suffice it to say that the cell 10 of the present invention develops an internal pressure on the order of 20 to 30 psi during normal recharging and the vent 37 may be set to discharge gas at a pressure of about 50 psi. The flat base 14 and cover 17 with the internal restraints of the present invention, however, will remain dimensionally stable without bulging up to an internal pressure on the order of about 120 psi. This insures that a reasonable safety margin is maintained for the flat cell case 11 of the present invention.

In keeping with another feature of the present invention, the battery 10 may be provided with circular or button terminals 40 as shown in the modified embodiment of FIG. 6. Such a terminal 40 may be in the form of a metal (e.g. nickel) rivet inserted in an aperture 41 in the peripheral wall 16 of the base 14. An O-ring 42 is preferably mounted on the rivet 40 between its head and the wall 16 and is compressed when the rivet is clinched. This insures that a gas-tight seal is provided between the terminal 40 and the base 14. The terminal 40 may be welded to an internal connector 43, similar to the connector 21 shown in FIG. 3.

It should be understood that the flat cell case 11 of the present invention is particularly suited to enclose a rechargeable nickel-cadmium cell. However, it is also suitable for other rechargeable cells. Moreover, while a thin, flat substantially rectangular case 11, as illustrated, is preferred, the invention is not limited to that configuration but could also be employed to a square or disc shaped cell, for example. Finally, while the foregoing description and the claims which follow employ the term "cell" it should be appreciated that multiple cells could be suitably stacked or arrayed within the case 11 without departing from the invention.

We claim as our invention:

1. A flat sealed case for a secondary cell comprising, in combination:
    a shallow, substantially flat base having a low peripheral wall;
    a thin substantially flat cover having peripheral edge means bonded to said peripheral wall; and,
    opposing means on said cover and base located internally thereof with respect to said peripheral edge means and said peripheral wall and bonded to one another for restraining said flat cover and base from bulging upon a build-up of internal pressure within said sealed cell case.

2. A cell case as defined in claim 1 wherein one of said cover and base has a peripheral tongue and the other of said cover and base has a peripheral groove adapted to mate with one another.

3. A cell case as defined in claim 1 wherein said restraining means includes an internal mortise on one of said cover and base and a mating tenon on the other of said cover and base.

4. A cell case as defined in claim 1 wherein said restraining means includes an internal socket on one of said cover and base and a mating pin on the other of said cover and base.

5. A cell case as defined in claim 4 wherein said pin is hollow and forms part of a resealable vent for relieving excess internal pressure from said case.

6. A cell case as defined in claim 1 wherein said base and cover are substantially rectangular and formed of a thin plastic material.

7. A cell case as defined in claim 1 wherein said cover and base are made of plastic and ultrasonically bonded together.

8. A cell case as defined in claim 1 wherein said cover and base are made of plastic and one of said cover and base includes a pair of metal terminal strips projecting therethrough and sealingly bonded therein.

9. A cell case as defined in claim 1 wherein said cover and base are made of plastic and wherein one of said cover and base includes a terminal aperture and a concentric external O-ring through which a metal terminal rivet is inserted crimped in sealing relation.

* * * * *